(12) United States Patent  
Furusawa

(10) Patent No.: US 8,224,533 B2
(45) Date of Patent: Jul. 17, 2012

(54) AUTO LIGHTING SYSTEM

(75) Inventor: Isao Furusawa, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 334 days.

(21) Appl. No.: 12/473,790

(22) Filed: May 28, 2009

(65) Prior Publication Data
US 2009/0323366 A1 Dec. 31, 2009

(30) Foreign Application Priority Data
Jun. 25, 2008 (JP) ................................. 2008-166055

(51) Int. Cl.
B60Q 1/14 (2006.01)
B60Q 1/08 (2006.01)
B60Q 1/16 (2006.01)
B60Q 1/02 (2006.01)

(52) U.S. Cl. ................ 701/49; 701/26; 701/45

(58) Field of Classification Search .......... 362/464–466; 701/49, 36, 45; 250/208.1; 307/10.8; 315/82–83; 340/425.5, 468–469; 382/103–104, 106–107
See application file for complete search history.

(56) References Cited

U.S. PATENT DOCUMENTS

| 6,587,573 B1* | 7/2003 | Stam et al. .......... 382/104 |
| 7,646,888 B2 | 1/2010 | Tsukamoto |
| 2004/0143380 A1* | 7/2004 | Stam et al. .......... 701/36 |
| 2005/0134483 A1* | 6/2005 | Monji et al. .......... 340/933 |
| 2007/0253597 A1 | 11/2007 | Utida et al. |
| 2008/0100139 A1 | 5/2008 | Michiyama et al. |
| 2008/0100225 A1 | 5/2008 | Fujie |
| 2009/0010494 A1* | 1/2009 | Bechtel et al. .......... 382/104 |
| 2011/0050102 A1* | 3/2011 | Le Bars et al. .......... 315/82 |

FOREIGN PATENT DOCUMENTS

| EP | 1 538 024 A1 | 6/2005 |
| JP | 58-40444 U | 3/1983 |
| JP | 9-86268 A | 3/1997 |
| JP | 9-167355 A | 6/1997 |
| JP | 2004-243895 A | 9/2004 |
| JP | 2005-75304 A | 3/2005 |
| JP | 2006-193068 A | 7/2006 |
| JP | 2007-293688 A | 11/2007 |
| WO | WO 98/19886 A1 | 5/1998 |

OTHER PUBLICATIONS

European Search Report dated Feb. 4, 2011 (Three (3) pages).
Japanese Office Action dated Oct. 25, 2011 (four (4) pages).

* cited by examiner

Primary Examiner — Khoi Tran
Assistant Examiner — Dale Moyer
(74) Attorney, Agent, or Firm — Crowell & Moring LLP

(57) ABSTRACT

An auto lighting system that performs lighting control that corresponds to the driver's visual perception is provided. An auto lighting system 1 includes imaging means 2 for capturing an image of the road ahead of a vehicle and lighting control means 3 for turning on or off lights such as headlights based on the image of the road ahead of the vehicle captured with the imaging means 2. The brightness ahead of the vehicle as perceived by the driver is recognized based on the image of the road ahead of the vehicle captured with the imaging means 2, and lighting control in which lights 101 are turned on or off is performed based on the brightness ahead of the vehicle.

15 Claims, 9 Drawing Sheets

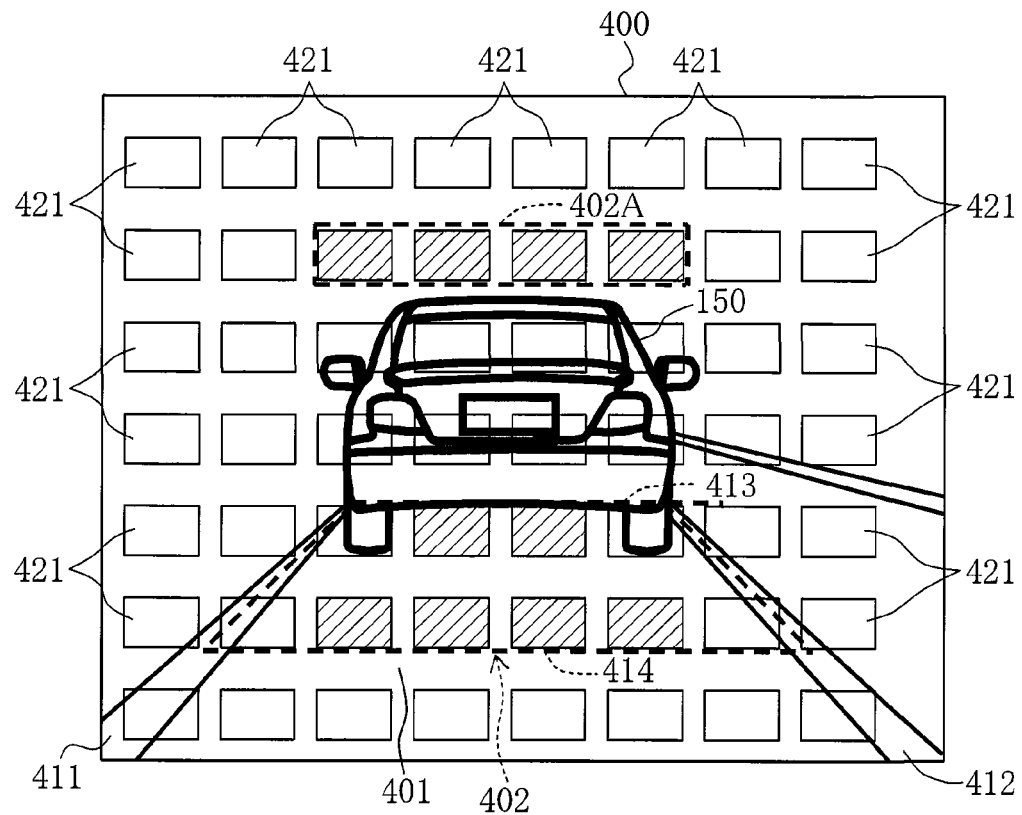
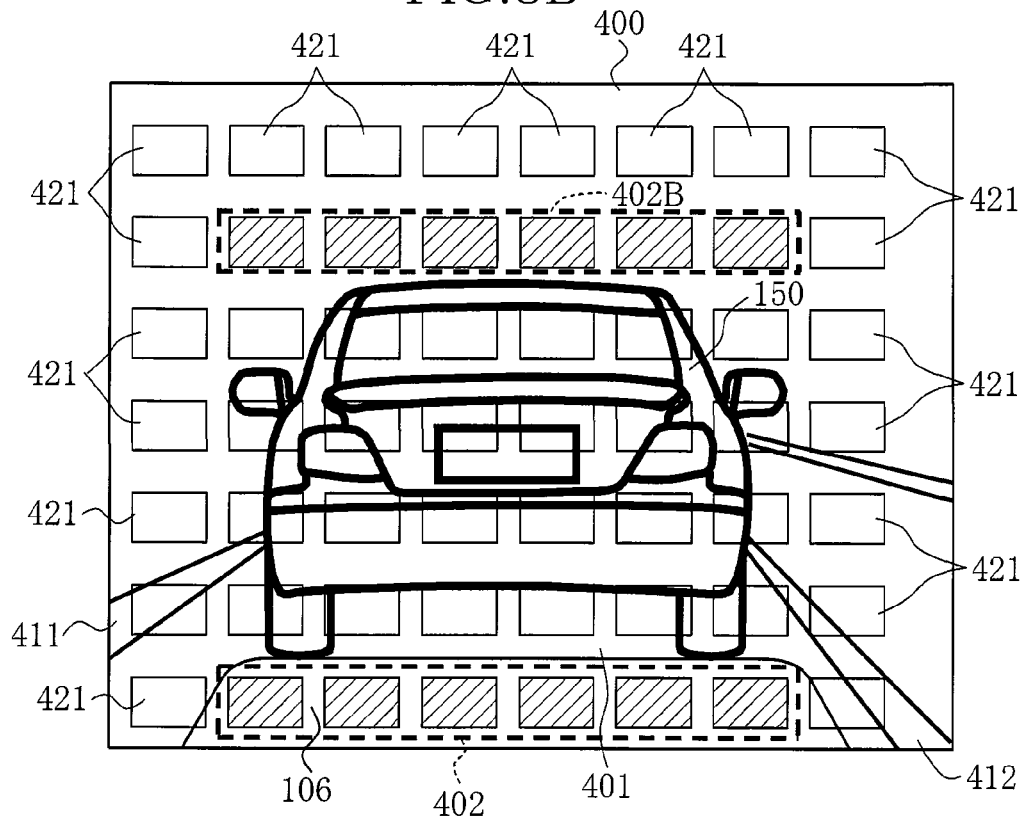

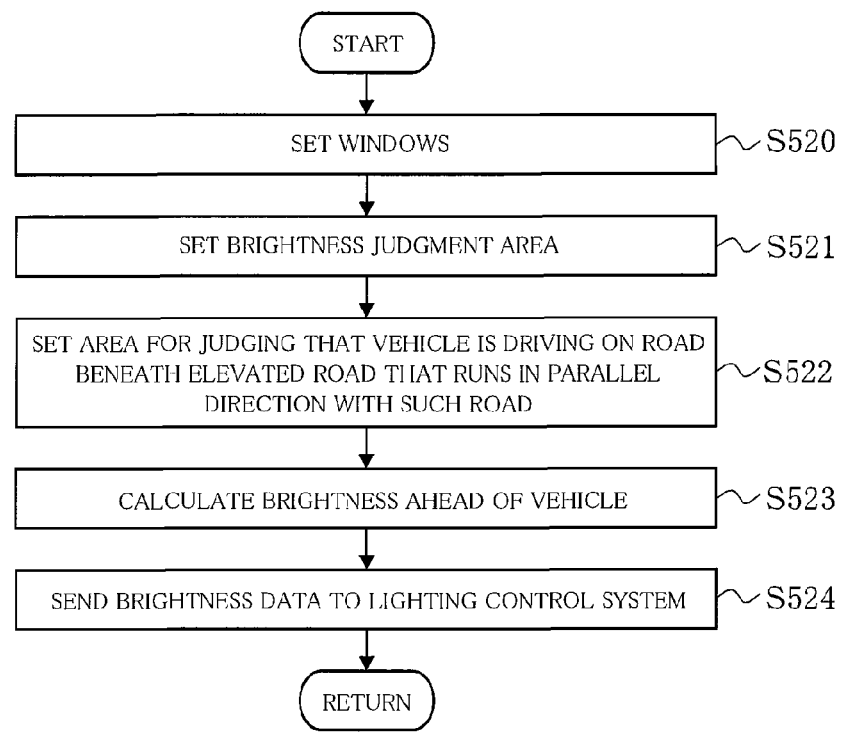
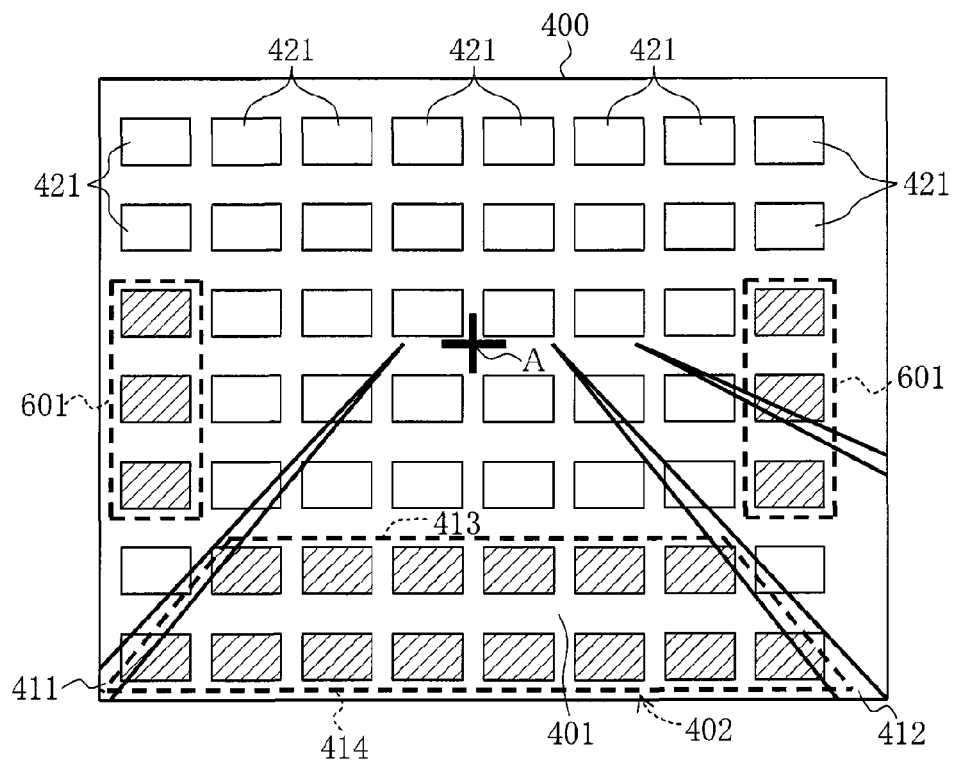

IMAGE OF VEHICLE DRIVING ON ROAD BENEATH ELEVATED ROAD THAT RUNS IN PARALLEL DIRECTION WITH SUCH ROAD

AUTO LIGHTING SYSTEM

BACKGROUND OF THE INVENTION

1. Field of the Invention

The present invention relates to an auto lighting system that automatically turns on or off automotive lights according to circumstances.

2. Background Art

Auto lighting systems that automatically turn on or off automotive lights (lamps) according to the ambient brightness have been proposed so far. Prior-art auto lighting systems use an illumination sensor as a means of detecting the ambient brightness. Such an illumination sensor is, as illustrated in Reference 1 (JP Utility Model Publication (Kokai) No. 58-40444 U (1983)) or Reference 2 (JP Patent Publication (Kokai) No. 9-86268 A (1997)) for example, disposed beneath a dashboard or rear window glass in such a manner that the sensor faces upward so as to detect the amount of light coming from above the vehicle as the ambient brightness of the vehicle.

SUMMARY OF THE INVENTION

However, since a driver drives a vehicle with his/her eyes focused on the road ahead of the vehicle, brightness as perceived by the driver may not be completely at the same level as that detected by the illumination sensor, and thus there can be a great difference in brightness level.

For example, when the sunlight is blocked by high walls provided along the road, the brightness above a vehicle is high whereas the brightness of the road ahead of the vehicle as perceived by the driver is low. Thus, although the driver perceives the ambient brightness as low, the prior-art auto lighting system could determine that the ambient brightness is high. In that case, the automotive lights are not turned on, behaving differently than perceived by the driver.

Further, when a driver is driving on a road beneath an elevated road that runs in a parallel direction with such road, the brightness right above the vehicle is low whereas the brightness ahead of the vehicle is high. Thus, although the driver does not perceive the ambient brightness as low, the auto lighting system could determine that the ambient brightness is low. In such a case, automotive lights are turned on, behaving differently than perceived by the driver. As described above, the aforementioned auto lighting system using the illumination sensor could perform lighting control under the different conditions than the conditions of the actual brightness as perceived by the driver.

The present invention has been made in order to solve the aforementioned problems with the prior art, and it is therefore an object of the present invention to provide an auto lighting system that performs lighting control so as to correspond to the driver's visual perception.

An auto lighting system of the present invention for achieving the aforementioned object includes imaging means for capturing an image of the road ahead of a vehicle, and lighting control means for performing lighting control by turning on or off lights based on the image captured with the imaging means.

According to the present invention, an image of the road ahead of a vehicle is captured with the imaging means, whereby the brightness ahead of the vehicle as perceived by the driver can be recognized. By turning on or off the lights based on the brightness ahead of the vehicle, an advantageous effect can be provided in that lighting control that does not bring discomfort to the driver can be performed.

BRIEF DESCRIPTION OF THE DRAWINGS

In the accompanying drawings:

FIGS. 8A and 8B illustrate another example of setting a brightness judgment area;

FIG. 11 is a flowchart illustrating a control process of a camera system according to the second embodiment;

FIG. 12 illustrates an example of setting an area for judging that a vehicle is driving on a road beneath an elevated road that runs in a parallel direction with such road;

DESCRIPTION OF SYMBOLS

Figure 1:
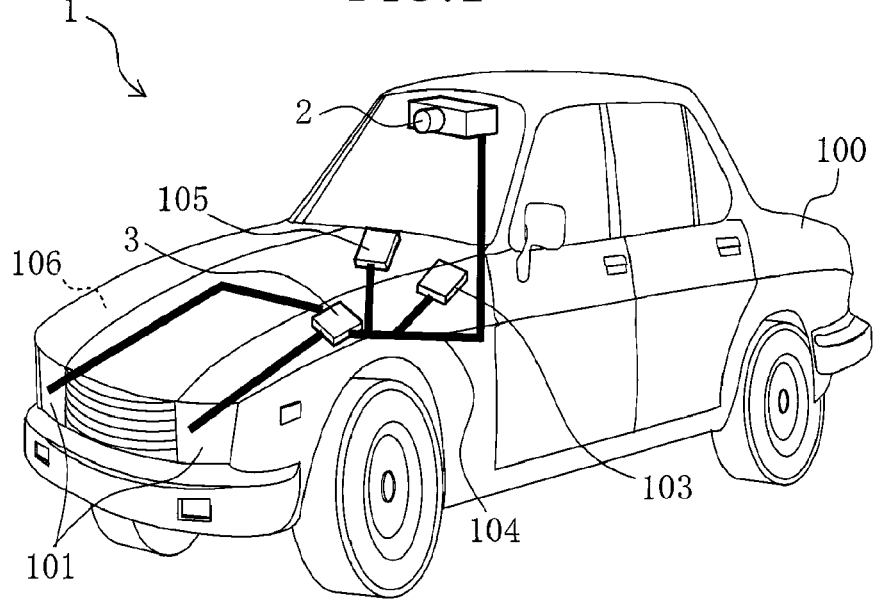
FIG. 1 is a system configuration diagram of an auto lighting system according to the first embodiment.

1 auto lighting system
2 camera system
3 lighting control system
100 vehicle
101 lights
106 front hood
150 preceding vehicle
400 image
401 road area
402 brightness judgment area
421 window
601 area for judging that a vehicle is driving on a road beneath an elevated road that runs in a parallel direction with such road (a first auxiliary judgment area)
701 area for judging that a vehicle is passing under an elevated road (a second auxiliary judgment area)
A vanishing point

DETAILED DESCRIPTION OF THE PREFERRED EMBODIMENTS

Hereinafter, embodiments of an auto lighting system 1 of the present invention will be described in detail with reference to the accompanying drawings.

First Embodiment

Figure 2:
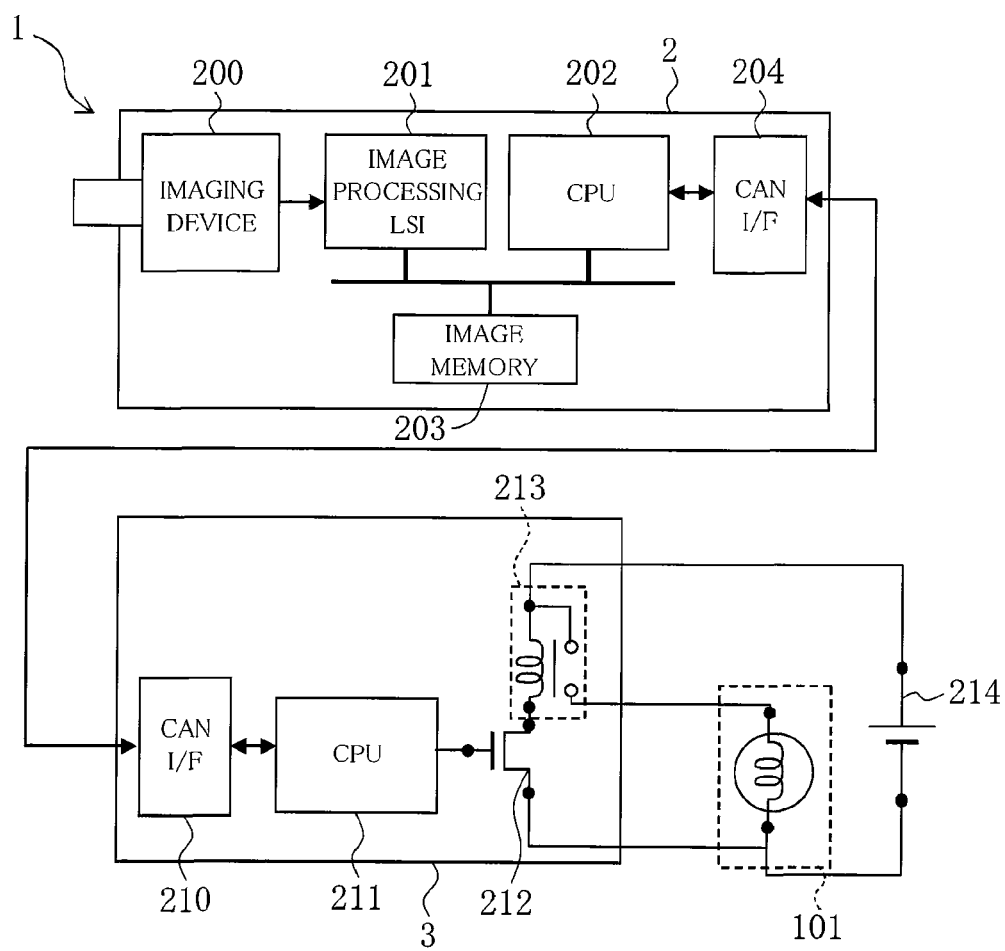
FIG. 2 is a functional block diagram illustrating the basic configurations of a camera system and a lighting control system.

FIG. 1 is a system configuration diagram of the auto lighting system 1 according to the first embodiment. FIG. 2 is a functional block diagram illustrating the basic configurations of a camera system 2 and a lighting control system 3.

As illustrated in FIGS. 1 and 2, the auto lighting system 1 is a system that turns on or off lights 101 of a vehicle 100 in accordance with the brightness ahead of the vehicle, and includes the camera system 2 and the lighting control system 3. The camera system 2 constitutes the imaging means for capturing an image of the road ahead of the vehicle, and the lighting control system 3 constitutes the lighting control means for performing lighting control by turning on or off the lights 101 based on the image captured with the camera system 2.

The camera system 2 is, as illustrated in FIG. 1, installed on the ceiling inside the vehicle 100, and the lighting control system 3 is stored in an engine room (not illustrated) of the vehicle 100. The camera system 2 and the lighting control system 3 are connected to each other via a CAN (control area network) bus 104, so that two-way communication is possible.

On the CAN bus 104, a vehicle information control unit 103 that collects vehicle information such as the vehicle speed or steering angle of the vehicle and a car navigation system 105 having positional information acquisition means using a GPS or the like and road map information are disposed in addition to the camera system 2 and the lighting control system 3, so that all of the systems can communicate with each other.

The camera system 2 includes, as illustrated in FIG. 2, an imaging device 200, an image processing LSI 201, a CPU 202, an image memory 203, and a CAN interface (hereinafter referred to as a CAN I/F) 204.

The imaging device 200 captures an image of the road ahead of the vehicle 100 that is the viewing direction of the driver while driving, through a lens. The image processing LSI 201 transfers the image data of the road ahead of the vehicle captured with the imaging device 200 to the image memory 203 and stores the data therein. In addition, the image processing LSI 201 performs image processing (for example, performs the function of a smoothing filter) to the image data stored in the image memory 203 in response to a command from the CPU 202, and transfers the result back to the image memory 203, and further performs image processing such as a calculation of the mean value of part of areas.

The CPU 202 recognizes the brightness ahead of the vehicle (brightness recognition means), driving lanes, or the presence or absence of a preceding vehicle or the like based on the image data of the road ahead of the vehicle stored in the image memory 203 as well as the data on the filtered image or the mean value calculated with the image processing LSI 201.

When recognizing the brightness ahead of the vehicle, driving lanes, the presence or absence of a preceding vehicle, or the like, the CPU 202 can use information on the vehicle speed, information on the steering angle, or the like that is sent from the vehicle information control unit 103 to the CAN bus 104. The CAN I/F 204 sends the result of recognition by the CPU 202 to the lighting control system 3 via the CAN bus 104.

The lighting control system 3 includes a CAN I/F 210, a CPU 211, a light-driving FET 212, and a light-driving relay 213. The CAN I/F 210 has a function of communicating signals with the CAN bus 140. The CPU 211 controls the lighting of the lights 101 based on the recognition result sent from the camera system 2 via the CAN I/F 210.

In the case of turning on the lights 101, the CPU 211 first turns on the light-driving FET 212 so that power is supplied from a battery 214 to the light-driving relay 213 and connection nodes are connected. Accordingly, power of the battery 214 is supplied to the lights 101 and the lights 101 are turned on.

In the case of turning off the lights 101, the CPU 211 first turns off the light-driving FET 212 to cut off the power supply from the battery 214 to the light-driving relay 213, and thus disconnects the connection nodes. Accordingly, the power supply to the lights 101 is cut off and the lights 101 are turned off.

Next, a method of judging the brightness ahead of the vehicle with the camera system 2 will be described.

Figure 3A:
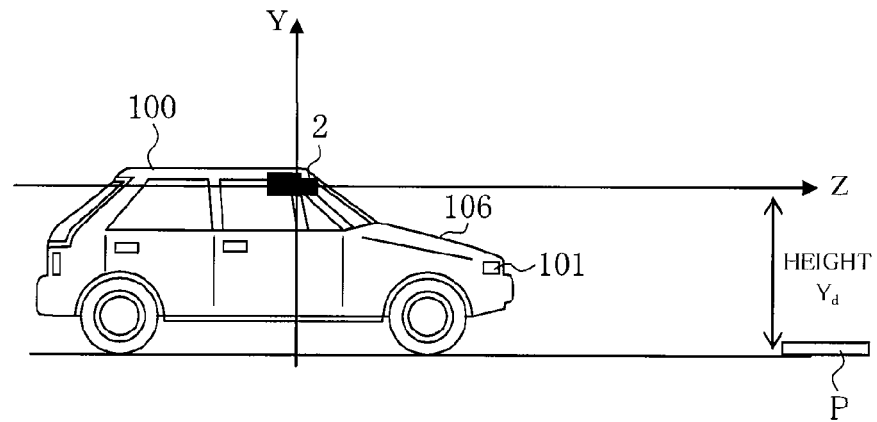
FIGS. 3A and 3B illustrate the principle of a mapping process of a camera system.
Figure 3B:
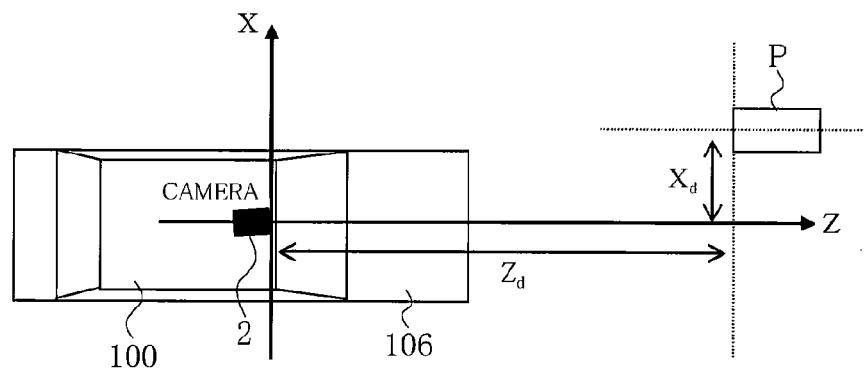
Figure 4:
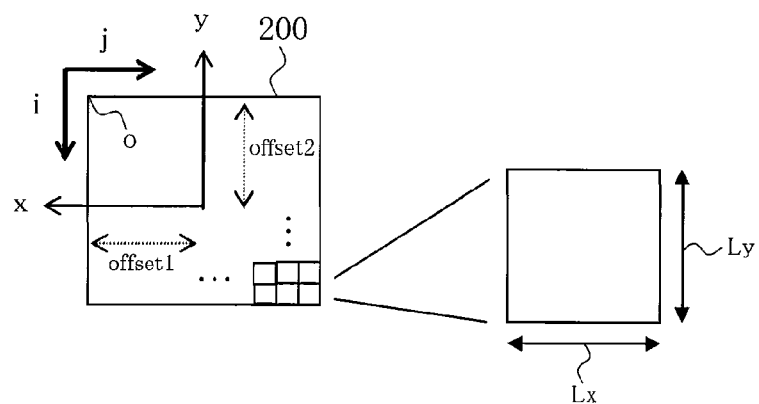
FIG. 4 illustrates the principle of a mapping process of a camera system.

The camera system 2 performs a process of uniquely mapping a scene ahead of the vehicle onto a screen. FIGS. 3A, 3B, and 4 illustrate the principle of the mapping process of the camera system 2.

As illustrated in FIGS. 3A, 3B, and 4, the focal length of the camera system 2 is indicated by F, the distance from the center of the imaging device 200 to the origin O at the upper left of the screen is indicated by Offset1 (horizontal) and Offset2 (vertical), the pixel size of the imaging device 200 is indicated by Ly (vertical)×Lx (horizontal), the rotation matrix is indicated by R, the distance till an object to be recognized (hereinafter referred to as a "recognition object" or "object") P is indicated by Zd, the horizontal position of the object P is indicated by Xd, and the height of the object P is indicated by Yd.

The installation angle of the camera system 2 is determined by the pitch angle $\phi$, yaw angle $\theta$, and roll angle $\psi$. Provided that the center of the lens of the camera system 2 coincides with the center of the effective imaging area of the imaging device 200, the position P(Xd,Yd,Zd) of the object can be uniquely determined on an imaging plane.

A point of the position P(Xd,Yd,Zd) of the recognition object on the vehicle coordinate system, in which the roll angle, pitch angle, and yaw angle of the camera system 2 are taken into account, is indicated by a point P'(Xd',Yd',Zd'). The point P'(Xd',Yd',Zd') is expressed by the following formula using the rotation matrix R.

$$\begin{bmatrix} Xd' \\ Yd' \\ Zd' \end{bmatrix} = R \begin{bmatrix} Xd \\ Yd \\ Zd \end{bmatrix} \quad \text{[Formula 1]}$$

The point P'(Xd',Yd',Zd') of the recognition object in three-dimensional space can be expressed by the following perspective transformation on the image coordinate system.

$$\begin{cases} x = F \cdot \dfrac{Xd'}{Zd'} \\ y = F \cdot \dfrac{Yd'}{Zd'} \end{cases} \quad \text{[Formula 2]}$$

The position (x,y) of the recognition object on the image is transformed into pixel coordinates (i,j). Since the distance from the center of the imaging device to the origin at the upper left of the screen is indicated by offset1 and offset2, (i,j) can be expressed by the following formula.

$$\begin{cases} i = (-x + \mathit{offset}1)/Lx \\ j = (-y + \mathit{offset}2)/Ly \end{cases} \quad \text{[Formula 3]}$$

In this manner, the camera system 2 can uniquely map a scene ahead of a vehicle onto a screen.

Figure 6:
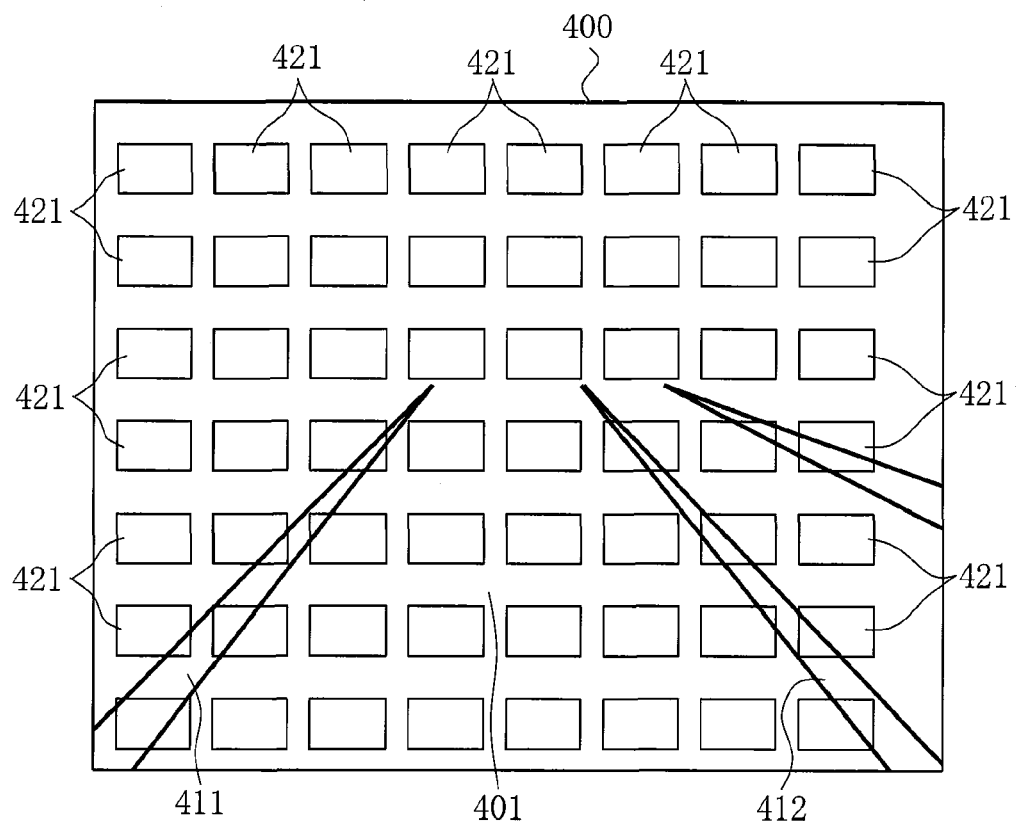
FIG. 6 is a schematic view of an image of the road ahead of a vehicle.

Here, lanes 411 and 412 (see FIG. 6) located on the left and right sides of the road ahead of a vehicle on the vehicle coordinate system are set in accordance with the following conditions. Provided that the vehicle 100 is at the middle of lanes with a lane width of 3.35 m on a straight road, a road area 401 on an image 400 can be determined as illustrated in FIG. 6. The road area 401 is defined as an area between the left and right lanes 411 and 412 on the surface of the road on which the vehicle is driving (hereinafter such a road will be referred to as a "vehicle driving road").

A brightness judgment area 402 (see for example FIGS. 7A and 7B) is set on the road surface ahead of the vehicle in the image 400. More specifically, the brightness judgment area 402 is defined as an area surrounded by the left lane 411, the right lane 412, an upper limit line 413, and a lower limit line 414 within the road area 401. It should be noted that the right and left ends of the brightness judgment area 402 coincide with the road area 401 whereas the upper and lower ends of the brightness judgment area 402 coincide with the upper and lower ends of an area on which the driver's eyes are fixed.

The upper limit line 413 and the lower limit line 414 of the brightness judgment area 402 can be set by means of, for example, the distance from the vehicle 100 to a side ahead of the vehicle, and can be moved in accordance with the vehicle speed. The area, on which the driver's eyes are fixed, of the road area 401 becomes closer to the vehicle as the vehicle speed is lower, whereas it becomes far from the vehicle as the vehicle speed is higher. Thus, the brightness judgment area 402 is also set on a farther side (in the forward direction) of the vehicle as the vehicle speed is higher, whereas it is set on a side closer to the vehicle as the vehicle speed is lower.

Figure 5:
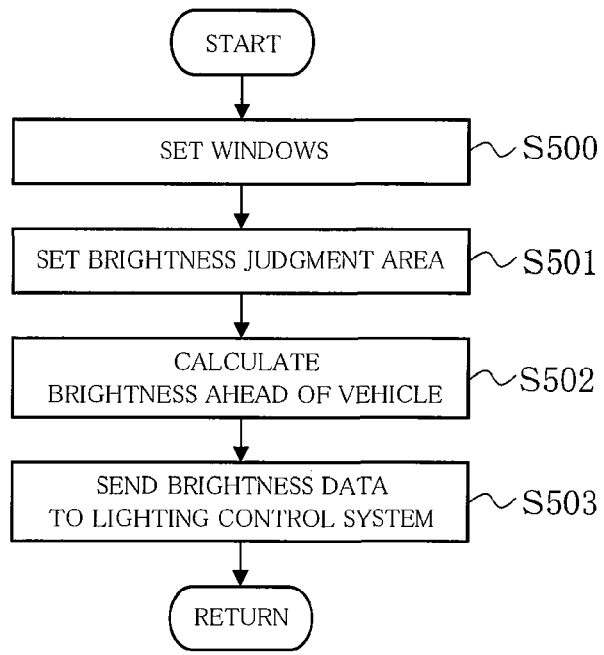
FIG. 5 is a flowchart illustrating a control process of a camera system.

Next, the operation of the auto lighting system 1 with the aforementioned configuration will be described. First, the camera system 2 will described, and then, the lighting control system 3 will be described. FIG. 5 is a flow chart illustrating the control process of the camera system 2. FIG. 6 is a schematic view of the image 400 of the road ahead of the vehicle. FIGS. 7A to 8B illustrate examples of setting the brightness judgment area 402.

In step S500, windows 421 that form a plurality of small areas are set in the image 400 of the road ahead of the vehicle captured with the imaging device 200 (window setting means). The windows 421 are evenly arranged in a dispersed manner such that they are spaced a predetermined distance away from each other in the image 400. In this embodiment, the windows 421 are disposed in a grid pattern from the top to bottom and left to right as illustrated in FIG. 6.

In step S501, the brightness judgment area 402 is set in the image 400 (brightness judgment area setting means). The brightness judgment area 402 is an area used for judging the brightness ahead of the vehicle 100, and is set based on at least one of the driving conditions of the vehicle 100 and the environmental conditions of the vehicle 100.

The CPU 202 acquires information on, for example, the vehicle speed, steering angle, or the like as the information on the driving conditions of the vehicle 100, from the vehicle information control unit 103 (first information collection means). In addition, the CPU 202 acquires information on the environmental conditions of the vehicle by recognizing the presence or absence of a preceding vehicle as well as driving lanes from the image 400 (second information collection means). Then, the CPU 202 sets the brightness judgment area 402 based on the information on the driving conditions of the vehicle or the environmental conditions of the vehicle.

Figure 7A:
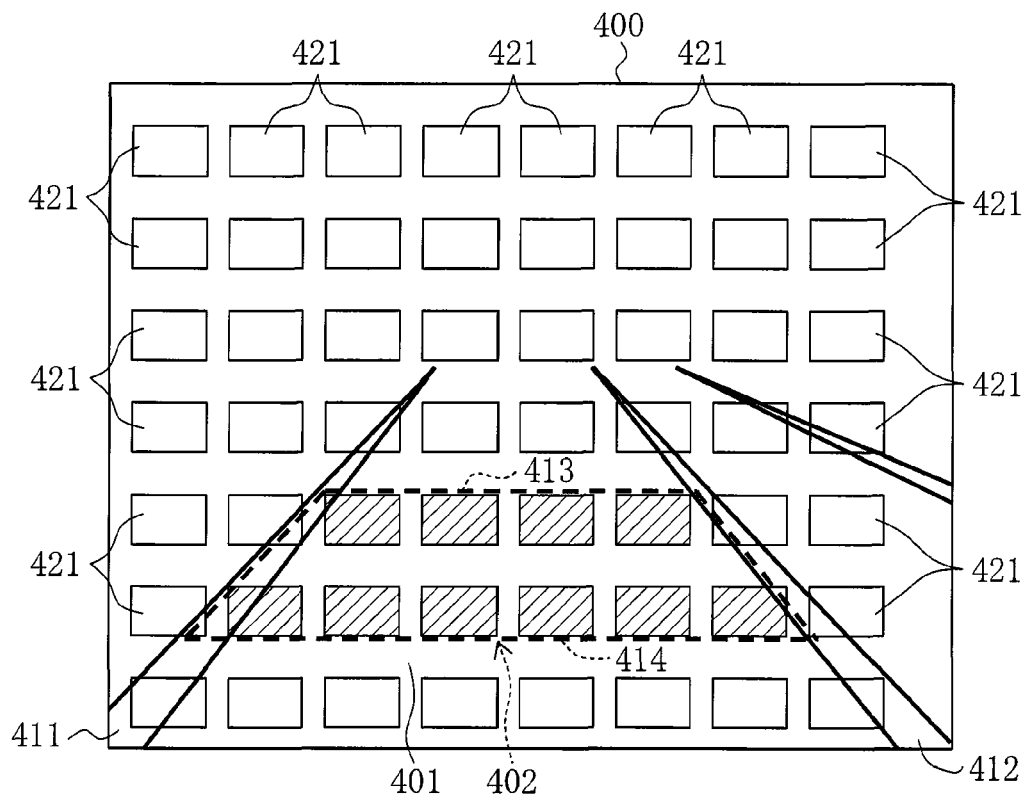
FIGS. 7A and 7B illustrate an example of setting a brightness judgment area.
Figure 7B:
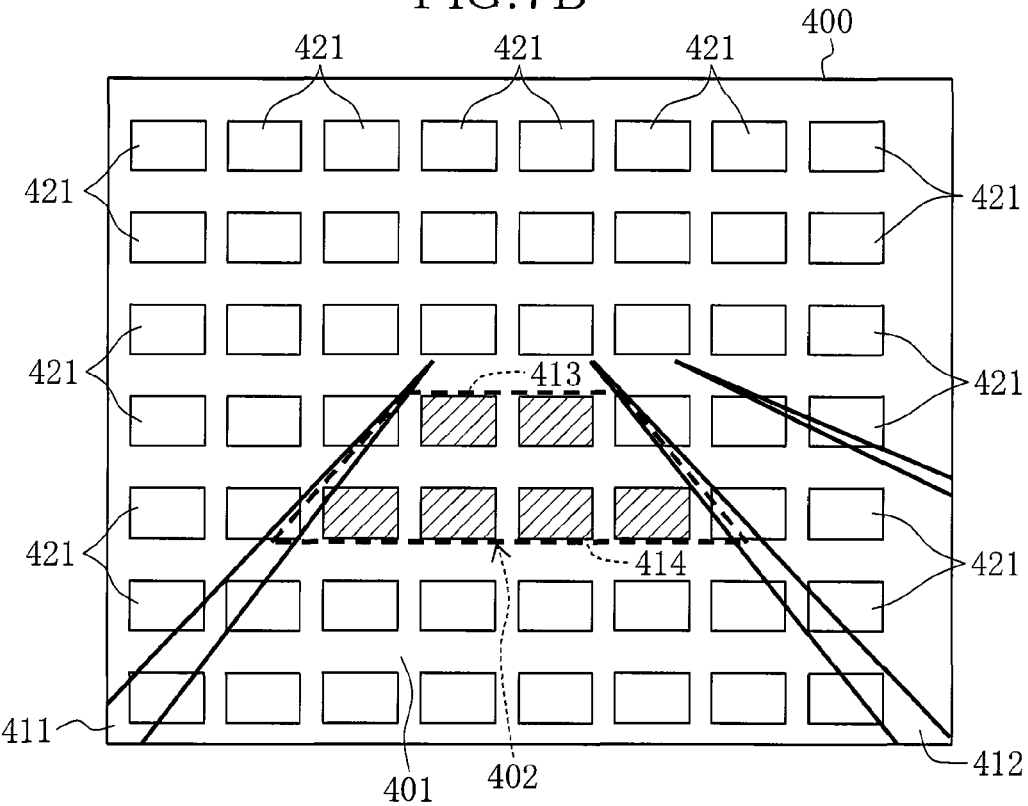

FIGS. 7A and 7B illustrate an example in which the brightness judgment area 402 is set based on the information on the driving conditions of the vehicle 100. Specifically, FIG. 7A illustrates a setting example in which the vehicle speed is high and FIG. 7B illustrates a setting example in which the vehicle speed is low.

First, the road area 401 is recognized based on the detection result of the driving lanes 411 and 412 with the CPU 202 or on prescribed values (for example, driving on a straight road with a lane width of 3.35 m, and driving on the middle of the lanes). Next, the upper limit line 413 and the lower limit line 414 are determined based on the vehicle speed.

The upper limit line 413 and the lower limit line 414 are set such that they are movable back and forth on the road ahead of the vehicle 100 in accordance with the vehicle speed. For example, when the vehicle speed is relatively low, the upper and lower limit lines 413 and 414 are set at a lower portion of the image 400 as illustrated in FIG. 7A, as a position relatively close to the vehicle 100. As a specific example, the upper limit line 413 is set at a position 40 m ahead of the vehicle and the lower limit line 414 is set at a position 20 m ahead of the vehicle.

Meanwhile, when the vehicle speed is relatively high, the upper and lower limit lines 413 and 414 are set at an upper portion of the image as illustrated in FIG. 7B, as a position relatively far from the vehicle 100. As a specific example, the upper limit line 413 is set at a position 60 m ahead of the vehicle and the lower limit line 414 is set at a position 40 m ahead of the vehicle. Accordingly, the brightness judgment area 402 is set in the vicinity of the vehicle 100 when the vehicle speed is relatively low, whereas it is set at a position far from the vehicle 100 when the vehicle speed is relatively high.

FIGS. 8A and 8B illustrate an example in which the brightness judgment area 402 is set based on the information on the driving environments of the vehicle. Specifically, FIG. 8A illustrates a setting example in which a preceding vehicle 150 is present and the vehicle 100 is driving, and FIG. 8B illustrates a setting example in which the preceding vehicle 150 is present and the vehicle 100 is stopping or driving at an ultralow speed due to, for example, a traffic jam.

First, the road area 401 is set by the aforementioned method. Then, when the presence of the preceding vehicle 150 is detected by means of image processing with the camera system 2, a milliwave rader (not illustrated), or the like, whether or not the vehicle 100 is driving at a speed greater than or equal to a predetermined reference speed is determined.

Then, if the preceding vehicle 150 is present and the vehicle 100 is driving at a speed greater than or equal to the reference speed, the brightness judgment area 402 is set at a position between the vehicle 100 and the preceding vehicle 150 in the road area 401, as illustrated in FIG. 8A.

Meanwhile, if the vehicle 100 is stopping or driving at an ultralow speed due to, for example, a traffic jam, or the preceding vehicle 150 is present, the brightness judgment area 402 is set at a position above a front hood 106 of the vehicle 100 as illustrated in FIG. 8B, because there is a possibility that an image of the road area 401 between the preceding vehicle 150 and the vehicle 100 might not be able to be captured. In addition, if the preceding vehicle 150 is present, brightness judgment areas 402A and 402B may be set at a position above the preceding vehicle 150 in the image 400 (a height position above the preceding vehicle).

Further, even when the means for detecting the presence of the preceding vehicle 150 is not provided, if the vehicle 100 is driving at an ultralow speed, it is speculated that there is a preceding vehicle ahead of the vehicle 100 due to a traffic jam, for example. Thus, in such a case, it is also possible to set the brightness judgment area 402 at a position above the front hood 106 of the vehicle 100 or set the brightness judgment area 402B at a height position above the preceding vehicle 105.

In step S502, the brightness ahead of the vehicle 100 is calculated (brightness calculation means). The brightness ahead of the vehicle 100 is the mean value of the brightness levels of the brightness judgment area 402. Here, windows 421 that are located in the brightness judgment area 402 are selected from among the plurality of windows 421. Then, the brightness of the brightness judgment area 402 is calculated using the brightness of each of the selected windows 421. The brightness of each window 421 is calculated from the luminance, shutter speed, and gain of the window 421.

In this embodiment, data on the brightness of each of the selected windows 421 is arranged in order of decreasing brightness level. Then, data on the brightest window 421 and data on the darkest window 421 are removed, and brightness data of the remaining windows is used to calculate the mean value of the brightness levels. The calculation result is determined as the brightness of the brightness judgment area 402, namely the brightness ahead of the vehicle 100. Accordingly, influence of noise can be eliminated and the brightness ahead of the vehicle 100 can be determined stably.

In step S503, data on the brightness ahead of the vehicle 100 calculated in step S502 is sent to the lighting control system 3 via the CAN bus 104. The lighting control system 3, in turn, performs lighting control based on the data on the brightness ahead of the vehicle 100 sent from the camera system 2.

Figure 9:
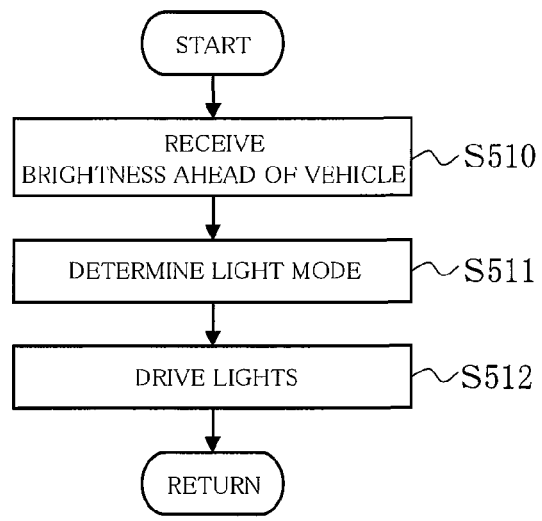
FIG. 9 is a flowchart illustrating a control process of a lighting control system.

Next, the control process of the lighting control system 3 will be described with reference to a flowchart of FIG. 9. In step S510, data on the brightness ahead of the vehicle 100 sent from the camera system 2 is received (data receiving means). Next, in step S511, the light mode of the lights 101 is selected from among "LIGHT OFF," "SMALL LIGHT ON," and "HEADLIGHT ON" based on the brightness data (light mode selection means).

Figure 10:
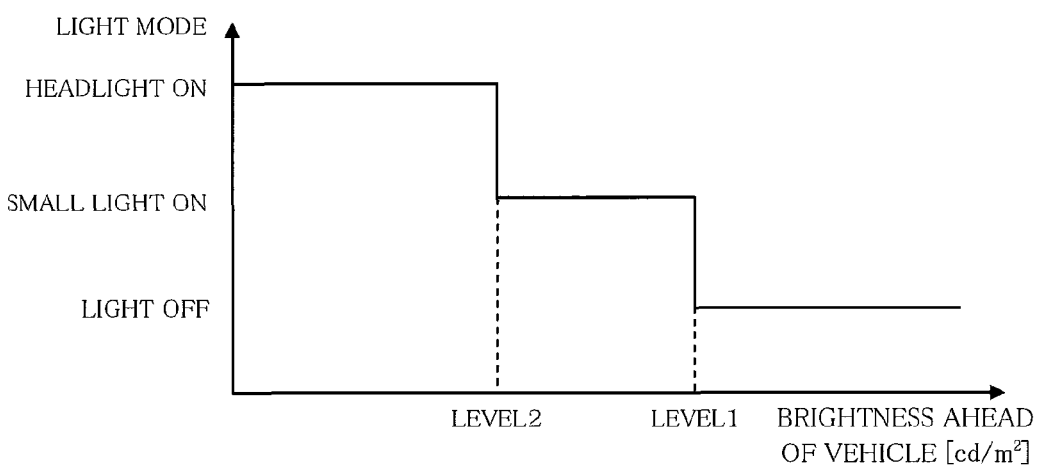
FIG. 10 illustrates the relationship between the brightness ahead of a vehicle and each light mode.

FIG. 10 illustrates the relationship between the brightness ahead of the vehicle 100 and each light mode. When the brightness ahead of the vehicle 100 (cd/m$^2$) is greater than or equal to a predetermined level 1 (a first reference value), "LIGHT OFF" is selected. When the brightness is higher than a predetermined level 2 (a second reference value) and less than the level 1, "SMALL LIGHT ON" is selected. When the brightness is less than the level 2, "HEADLIGHT ON" is selected.

In step S512, the lights 101 are driven in accordance with the light mode selected in step S511 (light-driving means). For example, when "LIGHT OFF is selected, the lights 101 are turned off. When "SMALL LIGHT ON" is selected, small lights such as front position lamps (side marker lamps) or tail lamps (rear position lamps) among the lights 101 are turned on. Meanwhile, when "HEADLIGHT ON" is selected, the headlights (headlamps) are turned on in addition to the small lights.

It should be noted that in selecting the light mode in step S511, if the steering angle of the vehicle 100 is greater than a predetermined threshold or if a direction indicator (blinker) is activated, it is predicted that there is a significant change in environmental conditions. In such a case, switching of the conditions such as changing the drive of the lights 101 does not need to be performed.

Further, when the brightness ahead of the vehicle 100 has shifted to a different level, the light mode does not need to be immediately switched. The light mode may be changed only after brightness in the same range has continued for a certain period of time (a time in which one can respond without discomfort at the entrance or exit of a tunnel).

According to the auto lighting system 1 with the aforementioned configuration, the brightness ahead of the vehicle as perceived by the driver can be recognized by capturing an image of the road ahead of the vehicle with the camera system 2. Accordingly, by turning on or off the lights 101 based on the brightness ahead of the vehicle, it is possible to perform lighting control that corresponds to the driver's visual perception and yet does not bring discomfort to the driver.

Second Embodiment

Next, the second embodiment of the present invention will be described. This embodiment is characterized in that, areas 601 for judging that a vehicle is driving on a road beneath an elevated road that runs in a parallel direction with such road (hereinafter simply referred to as "areas 601"), which are first auxiliary judgment areas, are set as areas for judging the brightness ahead of the vehicle, in addition to the brightness judgment area 402, whereby the brightness ahead of the vehicle is judged based on the brightness of both the brightness judgment area 402 and the areas 601.

FIG. 11 is a flowchart illustrating the control process of the camera system 2 according to the present embodiment. Processes performed in step S520 and step S521 are the same as those performed in step S500 and step S501 of the first embodiment illustrated in FIG. 5. Thus, description thereof is omitted.

In step S522, the areas (the first auxiliary judgment areas) 601 are set in the image 400 of the road ahead of the vehicle. Each of the areas 601 is set such that, as illustrated in FIG. 12, it extends across a region located at an outer side of the vehicle width direction of the vehicle driving road within the image 400, the region including a height position that is identical to the height position of the vanishing point A of the vehicle driving road. In this embodiment, the areas 601 are located on the opposite sides of the image 400 and each area includes three vertically consecutive windows. The vanishing point A is calculated with the CPU 202 based on the lanes 411 and 412 of the image 400 (vanishing point calculation means).

In step S523, the brightness ahead of the vehicle is calculated (brightness calculation means). Here, windows 421 that are located in the brightness judgment area 402 and the areas 601 are selected from among the plurality of windows 421. Then, the brightness of the brightness judgment area 402 and the brightness of the areas 601 are calculated using the brightness of each of the selected windows 421. It should be noted that the method of calculating the brightness is the same as that of the first embodiment. Thus, description thereof is omitted.

In step S524, data on the brightness of the brightness judgment area 402 and the brightness of the areas 601 that have been calculated in step S523 is sent to the lighting control system 3 via the CAN bus 104. The lighting control system 3, in turn, performs lighting control based on each brightness data sent from the camera system 2.

The lighting control system 3, when the brightness of the brightness judgment area 402 has suddenly changed from a bright state to a dark state, judges whether or not the brightness of the areas 601 is higher than a predetermined brightness reference value (a third brightness reference value). Whether or not the brightness of the brightness judgment area 402 has suddenly changed to a dark state is determined by the camera system 2. Specifically, when the brightness of the brightness judgment area 402 has decreased by a predetermined value or more within a predetermined reference time, it is determined that the brightness has suddenly changed to a dark state. The lighting control system 3, when it determines that the brightness of the areas 601 is higher than the third brightness reference value, performs lighting control by turning off the lights 101.

Figure 13:
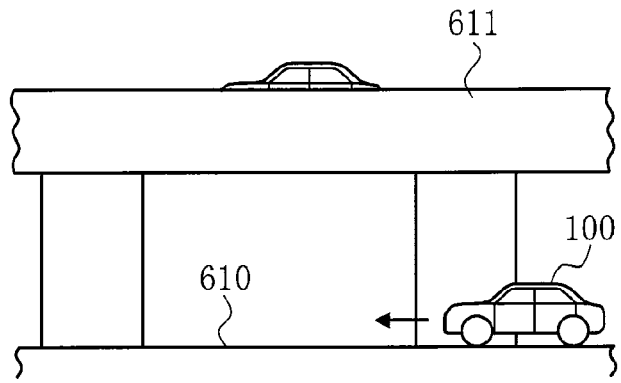
FIG. 13 illustrates an image of a vehicle driving on a road beneath an elevated road that runs in a parallel direction with such road.

Suppose for example that, as illustrated in FIG. 13, the vehicle 100 is driving on a road (a vehicle driving road) 610 beneath an elevated road that runs in a parallel direction with such road during bright daylight hours with the conditions that the road surface of the vehicle driving road 610 is dark in the shade of an elevated road 611 whereas the right and left sides of the vehicle 100 are bright. Then, in the case of the first embodiment, since the brightness ahead of the vehicle is judged based on only the brightness of the brightness judgment area 402, there is a possibility that the lights 101 could be controlled to be turned on regardless of the fact that the surroundings of the vehicle are bright.

In contrast, in this embodiment, the brightness ahead of the vehicle is judged by taking into consideration the brightness of the areas 601 in addition to the brightness judgment area 402. Thus, when the vehicle 100 is driving on the vehicle driving road 610 beneath the elevated road 611 that runs in a parallel direction with the road 610, the lights 101 can be prevented from being erroneously turned on, whereby lighting control that corresponds to the driver's visual perception can be performed.

Third Embodiment

Next, the third embodiment of the present invention will be described. This embodiment is characterized in that, an area 701 for judging that a vehicle is passing under an elevated road (hereinafter simply referred to as an "area 701"), which is a second auxiliary judgment area, is set as an area for judging the brightness ahead of the vehicle, in addition to the brightness judgment area 402 and the areas 601, whereby the brightness ahead of the vehicle is judged based on three regions including the brightness judgment area 402, the areas 601, and the area 701.

Figure 14:
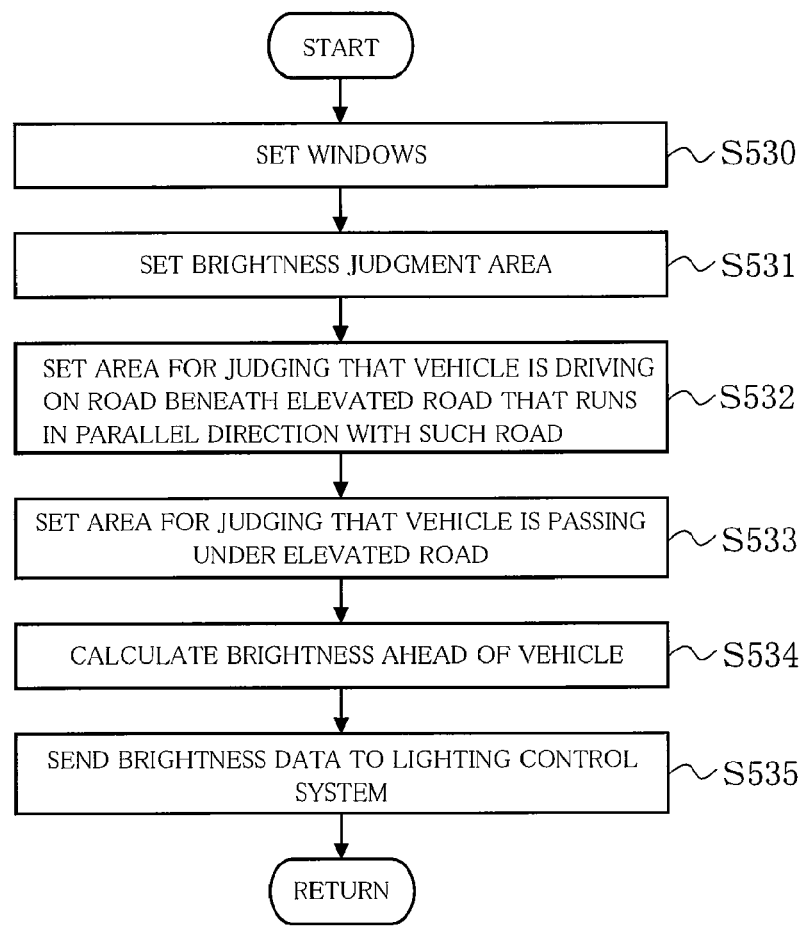
FIG. 14 is a flowchart illustrating a control process of a camera system according to the third embodiment.

FIG. 14 is a flowchart illustrating the control process of the camera system 2 according to the present embodiment. Processes performed in step S530 to step S532 are the same as those performed in steps S520 to step S522 of the second embodiment illustrated in FIG. 5. Thus, description thereof is omitted.

Figure 15:
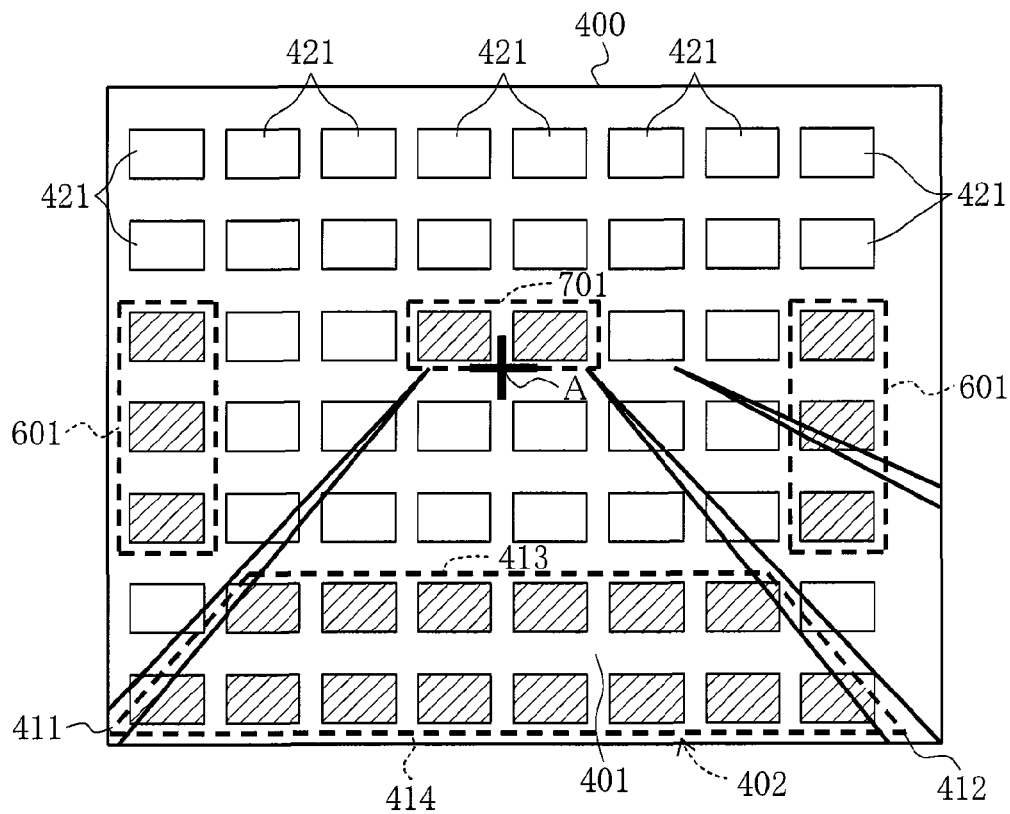
FIG. 15 illustrates an example of setting an area for judging that a vehicle is passing under an elevated road.

In step S533, the area (the second auxiliary judgment area) 701 is set in the image 400. The area 701 is, as illustrated in FIG. 15, provided at a position including the vanishing point A of the road area 401. More specifically, the area 701 is set such that it extends across a region whose lateral width includes the vanishing point A as well as the periphery thereof and whose vertical width includes at the lower end the vanishing point A and includes at the upper end a point that extends upward from the vanishing point A by a predetermined height. In this embodiment, the area 701 is set in a region including two windows 421 that are disposed in a horizontal direction above the vanishing point A.

In step S534, the brightness ahead of the vehicle is calculated (brightness calculation means). Here, windows 421 that are located in the brightness judgment area 402, the areas 601, and the area 701 are selected from among the plurality of windows 421.

Then, each of the brightness of the brightness judgment area 402, the brightness of the areas 601, and the brightness of the area 701 is calculated using the brightness of each of the selected windows 421. It should be noted that the method of calculating the brightness is the same as those of the first and second embodiments. Thus, description thereof is omitted.

In step S535, data on each of the brightness of the brightness judgment area 402, the brightness of the areas 601, and the brightness of the area 701 that have been calculated in step S534 is sent to the lighting control system 3 via the CAN bus 104. The lighting control system 3, in turn, performs lighting control based on the brightness of the brightness judgment area 402, the brightness of the areas 601, and the brightness of the area 701.

When the brightness of the brightness judgment area 402 has suddenly changed to a dark state with the condition of the light-off state, the lighting control system 3 judges whether or not the brightness of the areas 601 is higher than its predetermined brightness reference value (a third brightness reference value) and the brightness of the area 701 is higher than its predetermined brightness reference value (a fourth brightness reference value). If the brightness of the areas 601 and the brightness of the area 701 are lower than the third brightness reference value and the fourth brightness reference value, respectively, the lighting control system 3 determines that the vehicle is driving through a tunnel, and thus switches the light mode to "HEADLIGHT ON."

When judgment indicating that the presence or absence of the preceding vehicle 150 is unclear or judgment indicating that the preceding vehicle 150 or an oncoming vehicle is present is received from the camera system 2, the following two judgment processes are performed.

(1) If the brightness of the areas 601 is lower than the third brightness reference value and the brightness of the area 701 is higher than the fourth brightness reference value, the lighting control system 3 waits for the passage of a predetermined time (about a time in which a vehicle passes under an elevated road), and does not switch the light mode in that period. Then, after the predetermined time has passed, whether or not the brightness of the brightness judgment area 402 has increased is judged. If the brightness of the brightness judgment area 402 is determined to have increased, the lighting control system 3 judges that the vehicle has passed under an elevated road, and keeps the light mode in the off state with the lights 101 in the off state.

(2) Meanwhile, if the brightness of the brightness judgment area 402 is determined to have not increased after the predetermined time has passed, that is, if the brightness of the brightness judgment area 402 and the brightness of the areas 601 have been continuously lower than their respective brightness reference values and only the brightness of the area 701 has been continuously higher than the fourth brightness reference value, the lighting control system 3 determines that the vehicle is driving through a tunnel, and switches the light mode to "HEADLIGHT ON." At this time, the cause of the continuous bright state of the area 701 can be determined to be the influence of noise resulting from lights of oncoming vehicles and the like.

In addition, when judgment indicating that neither the preceding vehicle 150 nor an oncoming vehicle is present is received from the camera system 2, and when the brightness of each of the brightness judgment area 402 and the areas 601 has been continuously low whereas only the brightness of the area 701 has been continuously high, the lighting control system 3 does not wait for the passage of a predetermined time, and determines that the vehicle is passing under an elevated road, and thus keeps the light mode in "LIGHT OFF" with the lights 101 in the off state.

Figure 16:
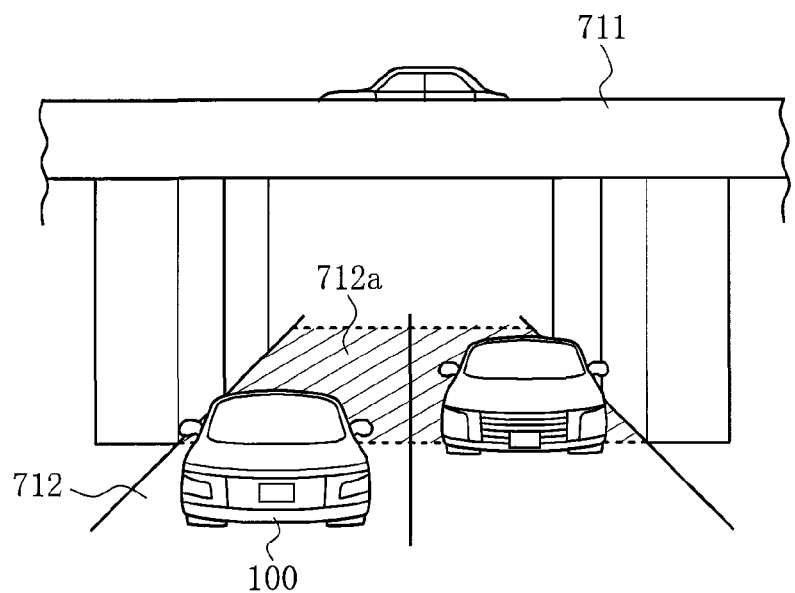
FIG. 16 illustrates an image of a vehicle passing under an elevated road.

Suppose for example that, as illustrated in FIG. 16, the vehicle 100 is passing under an elevated road (including an overhead crossing) 711 during bright daylight hours. Then, since the elevated road 711 is right above a vehicle driving road 712, the brightness of a road surface 712a of the vehicle driving road 712 is low in the shade whereas the brightness ahead of the vehicle is high.

In the aforementioned first and second embodiments, the brightness ahead of the vehicle is judged based on the brightness of the brightness judgment area 402 set on the road surface 712a. Thus, there is a possibility that the brightness ahead of the vehicle could be determined to be low and the lights 101 could thus be turned on.

In contrast, in this embodiment, the brightness ahead of the vehicle is judged by taking into consideration the brightness of the areas 601 and the brightness of the area 701, in addition to the brightness judgment area 402 as illustrated in FIG. 15. Therefore, in the condition in which the vehicle 100 is passing under the elevated road 711, the lights 101 can be prevented from being erroneously turned on, and thus lighting control that corresponds to the driver's visual perception can be performed.

It should be noted that the present invention is not to be construed as being limited to the descriptions of the aforementioned embodiments, and thus, various modification is possible without departing from the spirit and scope of the present invention.

What is claimed is:

1. An auto lighting system that turns on or off automotive lights in accordance with a brightness ahead of a vehicle, the auto lighting system comprising:
    imaging means for capturing an image of a road ahead of the vehicle said imaging means including brightness recognition means for recognizing a brightness ahead of the vehicle based on the image; and
    lighting control means for turning the lights on or off based on brightness, recognized recognition means, in a brightness judgment area of the image captured with the imaging means;
    brightness judgment area setting means for setting the brightness judgment area in the captured image based on at least one of a driving condition of the vehicle and an environmental condition of the vehicle;
    brightness calculation means for calculating a brightness of the brightness judgment area set by the brightness judgment area setting means;
    first information collection means for collecting vehicle information concerning a vehicle driving condition, wherein the brightness judgment area setting means sets the brightness judgment area based on the vehicle information collected by the first information collection means; and
    second information collection means for collecting information on an environmental condition of the vehicle, wherein the brightness judgment area setting means sets the brightness judgment area based on the information on the environmental condition of the vehicle collected by the second information collection means.

2. The auto lighting system according to claim 1, wherein:
    the imaging means includes window setting means for setting a plurality of windows in the image; and
    the brightness calculation means selects windows that are located in the brightness judgment area from among the plurality of windows, and calculates a brightness of the brightness judgment area based on a brightness of each of the selected windows.

3. The auto lighting system according to claim 2, wherein, after selecting the plurality of windows, the brightness calculation means removes the brightest window and the darkest window from the selected windows, calculates a mean value of brightness levels of the remaining Windows, and determines the calculation result as a brightness of the brightness judgment area.

4. The auto lighting system according to claim 1, wherein the brightness judgment area setting means sets in the image the brightness judgment area on a road surface ahead of the vehicle.

5. The auto lighting system according to claim 4, wherein the brightness judgment area is set on a farther side of the vehicle in a forward direction of the vehicle as a vehicle speed is higher, and is set on a side closer to the vehicle as the vehicle speed is lower.

6. The auto lighting system according to claim 1, wherein, when a vehicle speed is within a predetermined ultralow speed range or when a preceding vehicle is present, the brightness judgment area setting means sets in the image the brightness judgment area at a position above a front hood of the vehicle.

7. The auto lighting system according to claim 1, wherein when a vehicle speed is within a predetermined ultralow speed range or when a preceding vehicle is present, the brightness judgment area setting means, sets in the image the brightness judgment area at a predetermined height position above the preceding vehicle.

8. The auto lighting system according to claim 1, wherein, the lighting control means includes:
    light mode selection means that selects from among three light modes including "LIGHT OFF" in which the lights are turned off, "SMALL LIGHT ON" in which small lights are turned on, and "HEADLIGHT ON" in which headlights are turned on, the "LIGHT OFF" when the brightness recognized by the brightness recognition means is greater than or equal to a predetermined first reference value, selects the "SMALL LIGHT ON" when the brightness is higher than a predetermined second reference value and lower than the predetermined first reference value, and selects the "HEADLIGHT ON" when the brightness is lower than the predetermined second reference value; and
    light-driving means that drives the lights in accordance with the light mode selected by the light mode selection means.

9. The auto lighting system according to claim 8, wherein when a steering angle of the vehicle is greater than a predetermined threshold, or when a direction indicator of the vehicle is activated, the lighting control means, does not switch the conditions of the lights.

10. The auto lighting system according to claim 1, wherein:
    the imaging means includes vanishing point calculation means for calculating a vanishing point of a vehicle driving road within the image,
    the brightness judgment area setting means sets, in addition to said brightness judgment area, a first auxiliary judgment area in a region that extends across a region located at an outer side of a vehicle width direction of the vehicle driving road within the image, the region including a height position that is identical to a height position of the vanishing point; and
    the lighting control means turns said on or off based on the brightness of the brightness judgment area and a brightness of the first auxiliary judgment area.

11. The auto lighting system according to claim 10, wherein:
- when the brightness of the brightness judgment area has changed from a bright state to a dark state within a predetermined time, the lighting control means judges whether or not the brightness of the first auxiliary judgment area is higher than a predetermined third brightness reference value; and
- when the brightness of the first auxiliary judgment area is determined to be higher than the predetermined third brightness reference value, the lighting control means sets the lights to an off state.

12. The auto lighting system according to claim 1, wherein:
- the imaging means includes vanishing point calculation means for calculating a vanishing point of the vehicle driving road within the image;
- the brightness judgment area setting means sets in addition to said brightness judgment area, a first auxiliary judgment area that extends across a region located at an outer side of the vehicle width direction of the vehicle driving road within the image;
- said region includes a height position that is identical to a height position of the vanishing point;
- the brightness judgment area setting means also sets a second auxiliary judgment area that extends across a region including the vanishing point within the image; and
- the lighting control means turns said lights on or off based on the brightness of the brightness judgment area, brightness of the first auxiliary judgment area, and brightness of the second auxiliary judgment area.

13. The auto lighting system according to claim 12, wherein:
- when the brightness of the brightness judgment area has changed from a bright state to a dark state within a predetermined time, the lighting control means judges whether or not the brightness of the first auxiliary judgment area and the brightness of the secondary auxiliary judgment area are higher than a predetermined third brightness reference value and a predetermined fourth brightness reference value, respectively; and
- when the brightness of the first auxiliary judgment area and the brightness of the second auxiliary judgment area are determined to be lower than the predetermined third brightness reference value and the predetermined fourth brightness reference value, respectively, the lighting control means performs lighting control by setting the lights to on state.

14. The auto lighting system according to claim 13, wherein:
- when the brightness of the first auxiliary judgment area is lower than the third brightness reference value and the brightness of the second auxiliary judgment area is higher than the fourth brightness reference value, the lighting control means waits for the passage of a predetermined time and judges whether or not the brightness of the brightness judgment area has increased after the passage of the predetermined time;
- when the brightness of the brightness judgment area is determined to have exceeded a first reference value, the lighting control means sets the lights to an off state; and
- when the brightness of the brightness judgment area remains unchanged in the dark state, the lighting control means sets the lights to an on state.

15. The auto lighting system according to claim 14, wherein, when a preceding vehicle or an oncoming vehicle is not present and when the brightness of the first auxiliary judgment area is lower than the predetermined third brightness reference value and the brightness of the second auxiliary judgment area is higher than the predetermined fourth brightness reference value, the lighting control means sets the lights to an off state without waiting for the passage of the predetermined time.

* * * * *